US012341974B2

United States Patent
Zhu et al.

(10) Patent No.: US 12,341,974 B2
(45) Date of Patent: Jun. 24, 2025

(54) LOW-COMPLEXITY PANORAMIC VIDEO CODING METHOD CONSIDERING DISTORTION TEMPORAL PROPAGATION

(71) Applicant: UNIVERSITY OF ELECTRONIC SCIENCE AND TECHNOLOGY OF CHINA, Chengdu (CN)

(72) Inventors: Ce Zhu, Chengdu (CN); Xu Yang, Chengdu (CN); Hongwei Guo, Chengdu (CN); Lei Luo, Chengdu (CN); Linbo Qing, Chengdu (CN); Jingjing Hou, Chengdu (CN); Jin Du, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 39 days.

(21) Appl. No.: 18/398,251

(22) Filed: Dec. 28, 2023

(65) Prior Publication Data

US 2024/0137523 A1 Apr. 25, 2024

Related U.S. Application Data

(63) Continuation of application No. PCT/CN2023/087516, filed on Apr. 11, 2023.

(30) Foreign Application Priority Data

Oct. 18, 2022 (CN) .......................... 202211274219.1

(51) Int. Cl.
*H04N 19/149* (2014.01)
*H04N 19/147* (2014.01)
*H04N 19/169* (2014.01)
*H04N 19/172* (2014.01)
*H04N 19/174* (2014.01)
*H04N 19/597* (2014.01)

(52) U.S. Cl.
CPC ......... *H04N 19/147* (2014.11); *H04N 19/149* (2014.11); *H04N 19/172* (2014.11); *H04N 19/1883* (2014.11); *H04N 19/597* (2014.11)

(58) Field of Classification Search
None
See application file for complete search history.

(56) References Cited

U.S. PATENT DOCUMENTS

| 2018/0278936 A1* | 9/2018 | Hendry | ............... H04N 19/126 |
| 2020/0275116 A1* | 8/2020 | Bang | .................... H04N 19/597 |
| 2021/0337202 A1* | 10/2021 | Xiu | ....................... H04N 19/186 |

* cited by examiner

*Primary Examiner* — Samuel D Fereja
(74) *Attorney, Agent, or Firm* — Bayramoglu Law Offices LLC

(57) ABSTRACT

A low-complexity panoramic video coding method considering distortion temporal propagation is provided. By analyzing the inter-frame reference relationships under the random access coding structure and establishing the corresponding distortion propagation chain, the method utilizes distortion impact factors of coding units to adjust encoding parameters, thereby optimizing the encoding process. Furthermore, the method addresses the issue of oversampling arising from the varying geometric deformations in different latitude regions during the projection of spherical images in panoramic videos. This is achieved by adjusting coding parameters based on the ratio of area changes at different latitudes. The proposed approach significantly enhances coding performance.

4 Claims, 2 Drawing Sheets

LOW-COMPLEXITY PANORAMIC VIDEO CODING METHOD CONSIDERING DISTORTION TEMPORAL PROPAGATION

CROSS REFERENCE TO THE RELATED APPLICATIONS

This application is a continuation application of International Application No. PCT/CN2023/087516, filed on Apr. 11, 2023, which is based upon and claims foreign priority to Chinese Patent Application No. 202211274219.1, filed on Oct. 18, 2022, the entire contents of which are incorporated herein by reference.

TECHNICAL FIELD

The present invention belongs to the technical field of image processing, and particularly relates to a low-complexity panoramic video coding method considering distortion temporal propagation.

BACKGROUND

A panoramic video is a video taken by using a camera array or a 3D camera at all-round 360 degrees. When watching the video, users can adjust up-down and left-right orientations of the video freely. The panoramic video has the characteristics of a high frame rate, a high resolution (at least 4K) and a wide viewing range, thereby consuming a lot of resources in the storage and transmission of the panoramic video. A random access (RA) coding structure adopts a cyclic group of pictures (GOP) structure, and coded frames in the same positions in a GOP adopt the same random access coding structure and quantization parameter (QP). In H.266/VVC, the size of the GOP is increased to 16. The POC (Picture Order Count) of the coded frames is not equal to the Encoding Order Count (EOC). At the time, 16 coded frames in the GOP are assigned to 5 temporal layers (TL). The QP for each TL is determined by adding the QP of the I frame to the QP offset specific to that TL. Panoramic video coding within the RA coding structure of a conventional encoder faces several challenges. Initially, there is a disregard for the impact of redundant pixels generated in stretched areas during the projection of panoramic images onto a two-dimensional plane, affecting coding performance. Additionally, the temporal dependency of coding distortion on performance is overlooked, particularly within the intricate reference relationships of the RA coding structure. Here, the coding distortion of one unit influences subsequent units that use it as a reference. To tackle these issues, we propose a low-complexity panoramic video coding method that considers distortion temporal propagation. Firstly, coding parameters are adjusted based on the ratio of the spherical image area to the projected image area to mitigate performance loss caused by redundant pixels. Secondly, changes in frame pixel variance values are employed to detect scene changes, and the specific reference relationships within the RA coding structure. This leads to a substantial improvement in coding performance. Importantly, our invention eliminates the need to cache uncoded frame information, relying on the distortion information of reference frames to calculate distortion impact factors. This results in extremely low complexity while effectively enhancing coding performance.

The coding process in H.266/VVC includes:
1) dividing coding units.
2) selecting prediction modes, and supposing that the coding units are independent of each other $$\min_{\{P_i\}} J_i = D_i(P_i) + \lambda_i \cdot R_i(P_i)$$

In the formula, $\lambda_i$ represents the Lagrangian multiplier corresponding to the ith coding unit, and $P_i$ is the coding parameter (such as QPs, coding modes, tec.), $J_i$ is the rate-distortion cost of the ith coding unit. The encoder employs the minimization of $J_i$ to select the coding mode. The term "coding mode" predominantly refers to intra-frame and inter-frame prediction modes.

3) transformation: performing Hadamard transformation on prediction rediduals.
4) quantization: quantizing the transformed residuals, introducing quantization distortion.

$$Q_{STEP} = 2^{(QP-4)/6}$$

$Q_{STEP}$ is the quantization step size, and the relationship between the quantization step size and the QP is given by the above equation.

The existing 360Lib-based VTM encoder does not consider the oversampling issue caused by the projection of panoramic videos. Mean while, the VTM encoder, to simplify the problem, does not consider the temporal correlation between coding units. There is still significant room for improvement in rate-distortion performance.

SUMMARY

To address the aforementioned issues, the present invention provides a panoramic video coding method that considers distortion temporal propagation. Initially, the invention determines the occurrence of scene changes by comparing the change in pixel variance values between the current coding frame and the previous encoded frame (which may not necessarily be the previous displayed frame). In cases where scene changes are absent, the invention analyzes the inter-frame reference relationships under the RA coding structure and establishes a distortion propagation chain. Leveraging the continuity of images, the distortion impact factors of reference coding units are used to adjust the coding parameters of the current coding unit, aiming to optimize the encoding process.

The technical solution of the present invention is as follows:

A panoramic video coding method considering distortion temporal propagation includes the following steps:
S1. inputting a sequence to be encoded into an encoder;
S2. judging whether the current frame is the first frame of the video sequence or not, and if yes, performing:
Calculating the latitude value corresponding to a CTU row and calculating the area stretching ratio between the spherical surface and its projection plane;
calculating the frame-level Lagrange multiplier according to the frame-level QP;
completing the encoding of the current frame and repeating through step S2;
if not, proceeding to step S3;
S3. Calculating the pixel mean and variance value of the current coding frame;
S4. encoding CTUs sequentially;

S5. judging whether the difference between the pixel variance value of the current frame and that of the previous frame exceeds a threshold; if yes, proceeding to step S6; if not, proceeding to step S7;

S6. Adjusting the Lagrange multiplier of the current CTU according to the area stretching ratio obtained in step S2, and proceeding to step S17;

S7. Judging whether the current frame number is greater than 3 or not. If yes, proceeding to step S8; otherwise, proceeding to step S6;

S8. Judging whether the current frame number modulo 16 is equal to 0. If yes, proceeding to step S12; if not, proceeding to step S9;

S9. Judging whether the current frame number modulo 8 is equal to 0. If yes, proceeding to step S13; If not, proceeding to step S10;

S10. Judging whether the current frame number modulo 4 is equal to 0. If yes, proceeding to step S14; If not, proceeding to step S11;

S11. Judging whether the current frame number modulo 2 is equal to 0. If yes, proceeding to step S15; If not, proceeding to step S16;

S12. adjusting the Lagrange multiplier of the CTU according to the distortion temporal impact factor of the reference frame at the current frame number minus sixteen and the area stretching ratio obtained in step S2;

S13. adjust the Lagrange multiplier of the CTU according to the distortion temporal impact factors of two reference frames at the current frame number plus and minus eight, as well as the area stretching ratio obtained in step S2;

S14. adjusting the Lagrange multiplier of the CTU according to the distortion temporal impact factors of two reference frames at the current frame number plus and minus four, as well as the area stretching ratio obtained in step S2;

S15. adjusting the Lagrange multiplier of the CTU according to the distortion temporal impact factors of two reference frames at the current frame number plus and minus two, as well as the area stretching ratio obtained in step S2;

S16. adjusting the Lagrange multiplier of the CTU according to the distortion temporal impact factors of two reference frames at the current frame number plus and minus one, as well as the area stretching ratio obtained in step S2;

S17. Calculating a QP for the current CTU according to the Lagrange multiplier of the current CTU calculated in step S6, step S12, step S13, step S14, step S15 or step S16 and encode the CTU;

S18. Judging if the current CTU is the last one. If yes, completing the encoding of the current frame and proceeding to step S11; otherwise, returning to step S4;

S19. Judging whether the current frame is an odd numbered frame. If yes, proceeding to step S21; otherwise, proceeding to step S20;

S20. Acquiring the reconstruction error and motion compensation prediction (MCP) error of each CTU saved in the current frame to calculate the distortion temporal impact factor of each CTU within the current frame;

S21. Judging whether the current frame is the last frame. If yes, proceeding to step S22; otherwise, proceeding to step S2;

S22. Completing encoding the current panoramic video sequence.

Furthermore, in step S2, the method for calculating the area stretching ratio is as follows: define the spherical radius of a panoramic video as 'r'; then, the area of a spherical ring belt at latitude θ is given by:

$$S_s(\theta) = 2\pi \cdot r^2 \cdot \cos\theta \cdot \sin d\theta$$

After projecting onto a 2D plane, the area of the stretched region is obtained as:

$$S_E(\theta) = S_E\left(\frac{\pi}{2}\right) = 2\pi \cdot r^2 \cdot \sin d\theta$$

the area stretching ratio is:

$$k(\theta) = \frac{S_S(\theta)}{S_E(\theta)} = \frac{S_S(\theta)}{S_E(0°)} = \cos\theta \circ$$

Furthermore, step S3 is specified as follows:

$$P = \frac{1}{n*m}\sum_{i=0}^{m-1}\sum_{j=0}^{n-1} P_{i,j}$$

$$D = \frac{1}{n*m}\sum_{i=0}^{m-1}\sum_{j=0}^{n-1} (P_{i,j} - p)$$

Where P and D represent the pixel mean and variance value respectively. $P_{i,j}$ represents the pixel value of each pixel point, and the resolution is n*m.

Furthermore, in step S6 and step S12 to step S16, the distortion impact factors are calculated by:

$$\kappa = \frac{\sum_{i=1}^{l} k_i}{n}$$

where $k_i$ is the distortion impact factor of the ith reference frame in the distortion propagation chain, l is the total number of reference frames, and k is the final distortion impact factor for the current coding unit.

The present invention has the beneficial effect that the coding parameters are adjusted according to area changes at different latitudes based on the oversampling problem caused by the projection process of a spherical image.

Meanwhile, an extremely low-complexity method is adopted to calculate and apply the distortion impact factor, greatly improving coding performance.

DETAILED DESCRIPTION OF THE EMBODIMENTS

The present invention will be described in detail in conjunction with the accompanying drawings below.

Figure 1:
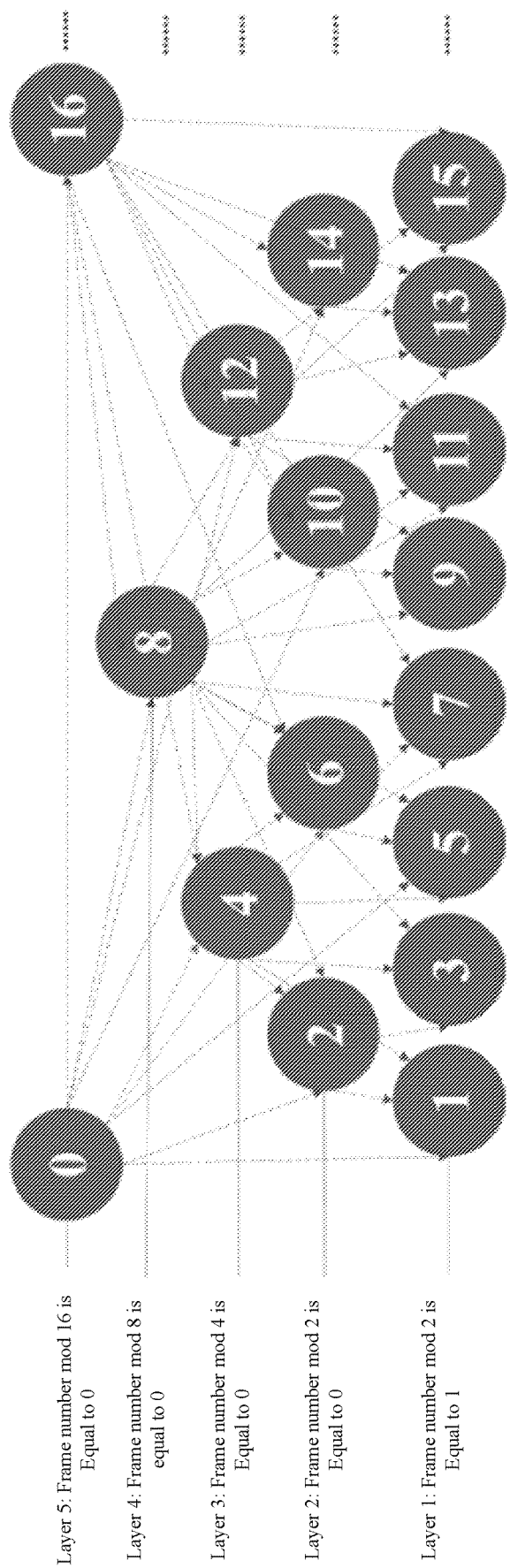
FIG. 1 depicts a schematic diagram of reference frames in the present invention.

FIG. 1 shows the reference dependency relationship between frames in a GOP with a size of 16 under the RA coding structure. It shows that the frames in a GOP are divided into 5 layers, wherein layer 1 belongs to odd frames, the frame number mod 2 is equal to 1, and the frames in this layer will not be referenced, so distortion impact factors of each coding unit in layer 1 do not need to be calculated; layer 5 is a key frame layer, frames in this layer refer to the previous key frame, and in this layer, the frame number mod 16 is equal to 0; in layer 4, the frame number mod 8 is equal to 0, frames in this layer refer to adjacent key frames in layer 5, namely frames at the frame number plus and minus 8; layer 3 belongs to frames of which the frame number mod 4 is equal to 0, and frames in this layer mainly refer to adjacent frames at the frame number plus and minus 4; and layer 2 belongs to frames of which the frame number mod 2 is equal to 0, and frames in this layer refer to adjacent frames at the frame number plus and minus 2. Thus, the reference relationship decides the source of the distortion impact factors used by the coding units. It should be noted that in actual coding, module operations need to be performed in turn in a hierarchical sequence so as to avoid the problem of program logic mess.

Figure 2:
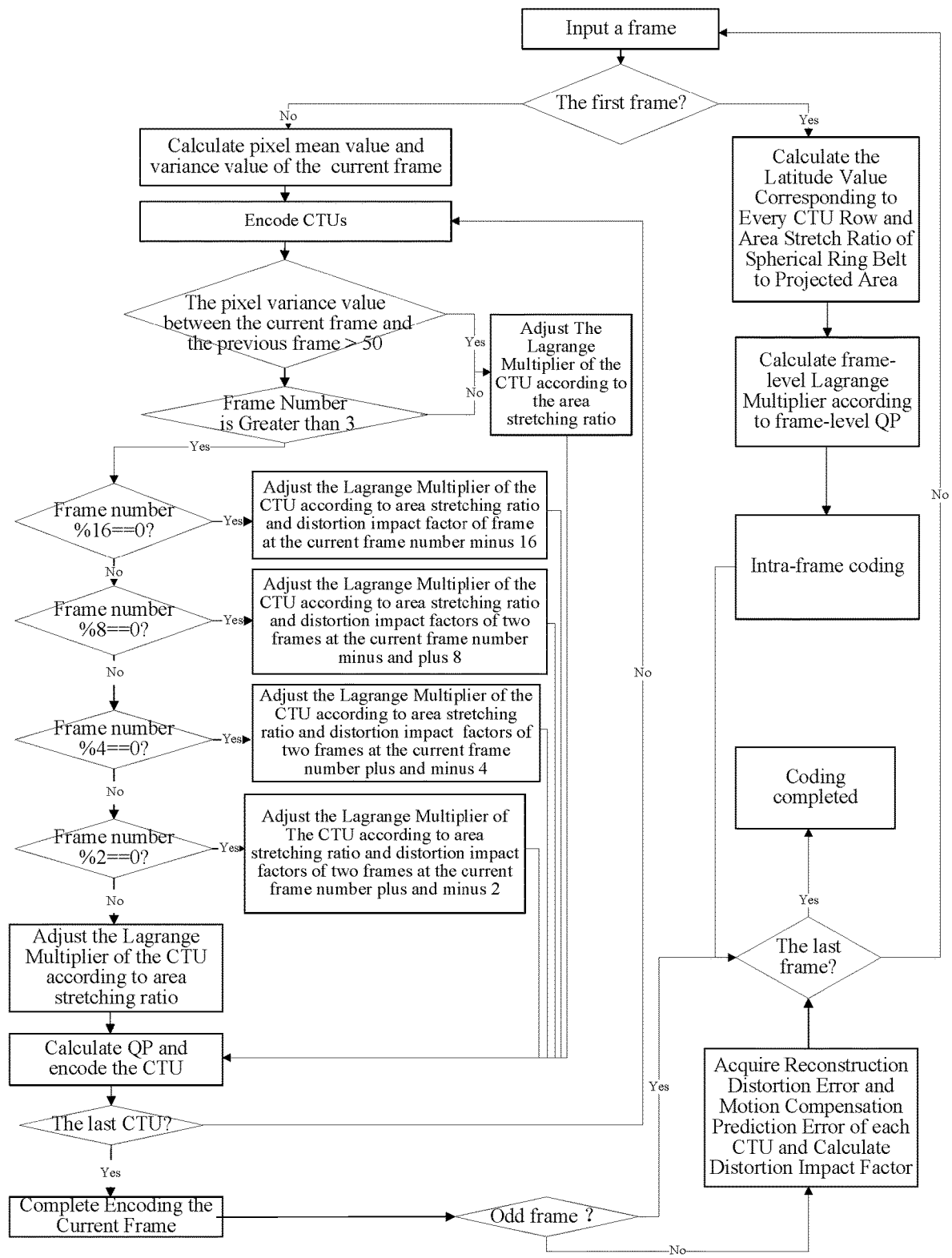
FIG. 2 is a schematic flow diagram of the method according to the present invention.

The coder chooses a group of optimal coding parameters and a coding mode at the minimum rate-distortion cost for an input video through the rate-distortion optimization (RDO) technology, aiming to reduce coding distortion under a certain rate constraint condition as far as possible or decrease coding bits under a certain coding distortion constraint condition as far as possible. The specific implementations of the coding method provided by the present invention are shown in FIG. 2.

For the first frame of a video, unlike traditional methods, the latitude value corresponding to a CTU row and the area stretching ratio of a spherical surface to a projection plane need to be calculated according to the method of the present invention. The method is specifically as follows:

a spherical radius is defined as 'r', the area of a spherical ring belt at the latitude θ can be calculated $$S_s(\theta) = 2\pi \cdot r^2 \cdot \cos\theta \cdot \sin d\theta$$

The area of the stretched area corresponding to the spherical region in the 2D plane is:

$$S_E(\theta) = S_E\left(\frac{\pi}{2}\right) = 2\pi \cdot r^2 \cdot \sin d\theta$$

The area ratio before and after the projection is $$k(\theta) = \frac{S_S(\theta)}{S_E(\theta)} = \frac{S_S(\theta)}{S_E(0°)} = \cos\theta$$

It is clear that the ratio decreases as the latitude increases, and in the equatorial region, namely at the latitude θ being 0, the area ratio is 1, with no stretch. Suppose that the entropy of the equatorial region dose not change before and after the projection, the closer it is to a pole point, the greater more entropy changes.

At the same time, the frame-level Lagrange multiplier of the first frame is calculated according to the frame-level QP.

For pictures of the second frame and subsequent frames, firstly the pixel mean and variance values of the current frame are calculated by:

$$P = \frac{1}{n*m}\sum_{i=0}^{m-1}\sum_{j=0}^{n-1} P_{i,j}$$

$$D = \frac{1}{n*m}\sum_{i=0}^{m-1}\sum_{j=0}^{n-1} (P_{i,j} - p)$$

wherein P and D represent the pixel mean and variance values, respectively. $P_{i,j}$ represents the pixel value of each pixel point, and the resolution is n*m.

If the difference in pixel variance between the current frame and the previous frame is greater than a threshold of 50, the Lagrange multiplier is adjusted based on the area ratio between the spherical and projection planes.

For pictures of the third frame and subsequent frames, because the distortion temporal impact factors have been obtained, the Lagrange multiplier is adjusted based on the distortion temporal impact factors and the area stretching ratio. Specifically, the original Lagrange multiplier is divided by the adjusted weighting to obtain the new Lagrange multiplier $\lambda_n$, thereby achieving temporal dependent rate-distortion optimization.

$$\lambda_n = \frac{\lambda_P}{k * k(\theta)}$$

Where $\lambda_P$ represents the frame-level Lagrange multiplier. It is evident that as the latitude value θ increases, k(θ) decreases, leading to an increase in the adjusted Lagrange multiplier. Conversely, as θ decreases, k(θ) increases, resulting in a decrease in the adjusted Lagrange multiplier. For a CTU with strong temporal dependency, a higher value of k implies a smaller adjusted Lagrange multiplier. This indicates a reduction in distortion for the current frame, facilitating higher rate-distortion performance for subsequent frames. On the other hand, a CTU with a weak temporal dependency will be coded relatively poorly.

Next, calculate the QP and then encode CTUs.

After encoding a frame, the reconstruction error and motion compensation prediction (MCP) error for each CTU can be obtained to calculate the temporal distortion impact factor for each CTU. If the frame number of the current frame is odd, it will not be referenced by subsequent frames, and the distortion impact factor does not need to be calculated. Otherwise, the temporal dependency of the CTU is measured using the ratio of the reconstruction distortion and MCP error distortion of the CTU.

$$k = \frac{D_{cur}}{D_{cur}^{MCP}}$$

For the current coding unit, the reconstruction distortion $D_{cur}$ and the MCP error $D_{cur}^{MCP}$ cannot be obtained before encoding the current frame. To achieve zero latency, based on the continuity of video images, the information of the corresponding CTU in the previous frame can be approximately used as a substitute. Experimental results are presented below to demonstrate the effectiveness of the proposed approach. The low-complexity panoramic video coding algorithm, considering distortion temporal propagation, is integrated into the H.266/VVC reference software VTM14.0 based on 360lib. The encoder is configured for RANDOM ACCESS, and experiments are conducted using standard panoramic video sequences recommended by the Joint Collaborative Team on Video Coding (JCT-VC).

The test set comprises all 14 video sequences from three categories: 8K, 6K, and 4K. Evaluation metrics include BD-Rate and coding time. A negative BD-Rate signifies a reduction in bit rate for the same reconstruction quality, indicating a gain in the technology. Conversely, a positive BD-Rate indicates an increase in bit rate for the same reconstruction quality, indicating a loss in technology.
Table 1 presents a comparison of rate-distortion performance between the proposed algorithm and the baseline. It is evident that the proposed approach achieves an average BD-RATE saving of approximately 4.2%.

TABLE 1

Rate-Distortion Performance Comparison tothevtm14.0 with 360lib Benchmark

| | SPSNR | | | CPP-PSNR | | | WS-PSNR | | |
|---|---|---|---|---|---|---|---|---|---|
| Proposed vs.ERP | Y | U | V | Y | U | V | Y | U | V |
| Trolley | −1.7% | 1.0% | −2.0% | −1.7% | 1.0% | −1.9% | −1.7% | 1.1% | −1.9% |
| Gas Lamp | −2.1% | −0.7% | 1.1% | −2.1% | −0.8% | 1.1% | −2.0% | −0.7% | 1.1% |
| Skate boarding_in_lot | −7.1% | −9.9% | −11.0% | −7.1% | −9.9% | −11.1% | −7.2% | −9.9% | −11.0% |
| Chairlift | −5.7% | −5.4% | −6.8% | −5.6% | −5.4% | −6.8% | −5.6% | −5.3% | −6.8% |
| Kite Flite | −3.1% | −2.3% | −3.2% | −3.2% | −2.4% | −3.2% | −3.1% | −2.4% | −3.1% |
| Harbor | −2.0% | −5.2% | −4.9% | −2.1% | −5.1% | −4.8% | −2.0% | −5.1% | −4.8% |
| Pole Vault | −6.8% | −6.8% | −7.8% | −6.8% | −6.5% | −7.5% | −6.8% | −6.4% | −7.3% |
| Aerial City | −4.9% | −5.6% | −6.3% | −4.9% | −5.6% | −6.4% | −4.8% | −5.5% | −6.3% |
| Driving In City | −0.2% | 3.0% | 4.5% | −0.2% | 3.0% | 4.6% | 0.0% | 3.1% | 4.6% |
| Driving In Country | −8.7% | −11.2% | −12.2% | −8.7% | −11.2% | −12.1% | −8.5% | −11.2% | −12.2% |
| Overall | −4.2% | −4.3% | −4.9% | −4.2% | −4.3% | −4.8% | −4.2% | −4.2% | −4.8% |

Table 2 compares the coding time between the proposed algorithm and the baseline, demonstrating a time saving of 16.2% with the proposed approach.

TABLE 2

Comparison of Coding Time

| Resolution rate | Sequence | QP | Benchmark coding time | Coding time in the invention |
|---|---|---|---|---|
| 8K | Trolley | 22 | 87.19 | 76.98 |
| | | 27 | 56.10 | 50.95 |
| | | 32 | 37.26 | 34.84 |
| | | 37 | 25.53 | 23.14 |
| | Gas Lamp | 22 | 52.76 | 48.79 |
| | | 27 | 33.56 | 28.53 |
| | | 32 | 21.15 | 18.35 |
| | | 37 | 15.10 | 13.03 |
| | Skate boarding_in_lot | 22 | 259.53 | 243.29 |
| | | 27 | 169.53 | 139.19 |
| | | 32 | 92.58 | 74.92 |
| | | 37 | 47.02 | 40.53 |
| | Chairlift Ride | 22 | 159.54 | 136.45 |
| | | 27 | 94.58 | 79.53 |
| | | 32 | 58.99 | 47.35 |
| | | 37 | 33.46 | 26.12 |
| | Kite Flite | 22 | 109.95 | 93.47 |
| | | 27 | 71.13 | 62.30 |
| | | 32 | 47.83 | 42.44 |
| | | 37 | 32.07 | 27.61 |
| | Harbor | 22 | 73.58 | 65.18 |
| | | 27 | 46.09 | 40.41 |
| | | 32 | 27.96 | 24.55 |
| | | 37 | 18.14 | 15.45 |
| 4K | Pole Vault | 22 | 271.31 | 215.60 |
| | | 27 | 100.36 | 77.64 |
| | | 32 | 47.91 | 38.68 |
| | | 37 | 27.15 | 22.42 |
| | Aerial City | 22 | 186.05 | 134.94 |
| | | 27 | 68.75 | 50.81 |
| | | 32 | 33.13 | 25.04 |
| | | 37 | 19.28 | 14.61 |
| | Driving In City | 22 | 183.75 | 150.49 |
| | | 27 | 90.32 | 81.70 |
| | | 32 | 51.03 | 47.27 |
| | | 37 | 30.01 | 27.07 |
| | Driving In Country | 22 | 252.09 | 212.59 |
| | | 27 | 139.22 | 114.66 |
| | | 32 | 83.71 | 65.14 |
| | | 37 | 49.13 | 37.32 |
| Overall coding time | | | 3303.83 | 2769.38 |

What is claimed is:

1. A low-complexity panoramic video coding method considering distortion temporal propagation, comprising the following steps:
   S1: inputting a sequence to be encoded into an encoder;
   S2: judging whether a current frame is a first frame of a video sequence or not, and if yes, performing:
      calculating a latitude value corresponding to a CTU row and calculating an area stretching ratio between a spherical surface and its projection plane;
      calculating a frame-level Lagrange multiplier according to a frame-level QP;
      completing the encoding of the current frame and repeating through step S2;
   if not, proceeding to step S3;
   S3: calculating a pixel mean and variance value of the current coding frame;
   S4: encoding CTUs sequentially;

S5: judging whether the difference between the pixel variance value of the current frame and a pixel variance value of the previous frame exceeds a threshold; if yes, proceeding to step S6; if not, proceeding to step S7;

S6: adjusting the Lagrange multiplier of the CTU according to the area stretching ratio obtained in step S2, and proceeding to step S17;

S7: judging whether the current frame number is greater than 3 or not; if yes, proceeding to step S8; otherwise, proceeding to step S6;

S8: judging whether the current frame number modulo 16 is equal to 0; if yes, proceeding to step S12; if not, proceeding to step S9;

S9: judging whether the current frame number modulo 8 is equal to 0; if yes, proceeding to step S13; if not, proceeding to step S10;

S10: judging whether the current frame number modulo 4 is equal to 0; if yes, proceeding to step S14; if not, proceeding to step S11;

S11: judging whether the current frame number modulo 2 is equal to 0; if yes, proceeding to step S15; if not, proceeding to step S16;

S12: adjusting the Lagrange multiplier of the CTU according to a distortion temporal impact factor of the reference frame at the current frame number minus sixteen and the area stretching ratio obtained in step S2;

S13: adjust the Lagrange multiplier of the CTU according to the distortion temporal impact factors of two reference frames at the current frame number plus and minus eight and the area stretching ratio obtained in step S2;

S14: adjusting the Lagrange multiplier of the CTU according to the distortion temporal impact factors of two reference frames at the current frame number plus and minus four and the area stretching ratio obtained in step S2;

S15: adjusting the Lagrange multiplier of the CTU according to the distortion temporal impact factors of two reference frames at the current frame number plus and minus two and the area stretching ratio obtained in step S2;

S16: adjusting the Lagrange multiplier of the CTU according to the distortion temporal impact factors of two reference frames at the current frame number plus and minus one and the area stretching ratio obtained in step S2;

S17: calculating a QP for the current CTU according to the Lagrange multiplier of the current CTU calculated in step S6, step S12, step S13, step S14, step S15 or step S16 and encode the CTU;

S18: judging if the current CTU is the last one; if yes, completing the encoding of the current frame and proceeding to step S11; otherwise, returning to step S4;

S19: judging whether the current frame is an odd numbered frame; if yes, proceeding to step S21; otherwise, proceeding to step S20;

S20: acquiring the reconstruction error and motion compensation prediction (MCP) error of each CTU saved in the current frame to calculate the distortion temporal impact factor of each CTU within the current frame;

S21: judging whether the current frame is the last frame; if yes, proceeding to step S22; otherwise, proceeding to step S2;

S22: completing encoding the current panoramic video sequence.

2. The low-complexity panoramic video coding method considering distortion temporal propagation according to claim 1, wherein in step S2, the method for calculating the area stretching ratio is as follows: define a spherical radius of a panoramic video as r; then, an area of a spherical ring belt at latitude θ is given by:

$$S_s(\theta) = 2\pi \cdot r^2 \cdot \cos\theta \cdot \sin d\theta$$

after projecting onto a 2D plane, the area of the stretched region is obtained as:

$$S_E(\theta) = S_E\left(\frac{\pi}{2}\right) = 2\pi \cdot r^2 \cdot \sin d\theta$$

the area stretching ratio is:

$$k(\theta) = \frac{S_S(\theta)}{S_E(\theta)} = \frac{S_S(\theta)}{S_E(0°)} = \cos\theta.$$

3. The low-complexity panoramic video coding method considering distortion temporal propagation according to claim 1, wherein step S3 is specifically as follows:

$$P = \frac{1}{n*m}\sum_{i=0}^{m-1}\sum_{j=0}^{n-1} P_{i,j}$$

$$D = \frac{1}{n*m}\sum_{i=0}^{m-1}\sum_{j=0}^{n-1} (P_{i,j} - p)$$

wherein P and D represent the pixel mean and variance value respectively; $P_{i,j}$ represents the pixel value of each pixel point, and the resolution is n*m.

4. The low-complexity panoramic video coding method considering distortion temporal propagation according to claim 1, in step S6 and step S12 to step S16, the distortion impact factors are calculated by:

$$K = \frac{\sum_{i=1}^{l} k_i}{n}$$

wherein $k_i$ is the distortion impact factor of the ith reference frame in the distortion propagation chain, l is the total number of reference frames, and k is the final distortion impact factor for the current coding unit.

* * * * *